Figure 1:
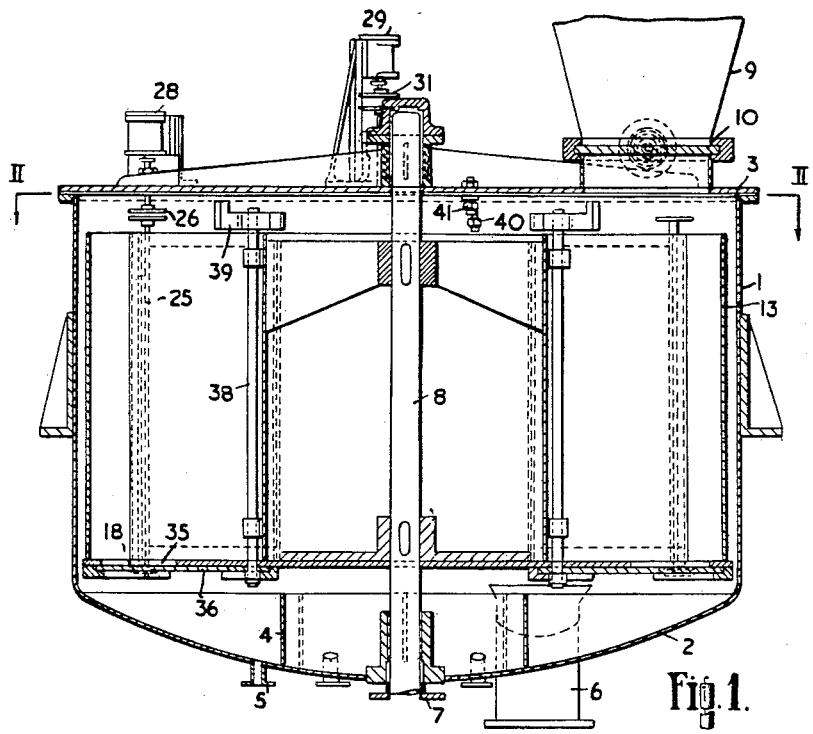

Dec. 13, 1955  T. ANDREWS  2,726,939
PROCESS FOR EXTRACTING SOLIDS
Filed April 29, 1949  6 Sheets-Sheet 1

INVENTOR,
Thomas Andrews
John J. V. Armstrong
ATTORNEY

Dec. 13, 1955 T. ANDREWS 2,726,939
PROCESS FOR EXTRACTING SOLIDS
Filed April 29, 1949 6 Sheets-Sheet 3

INVENTOR.
Thomas Andrews
BY John J. V. Armstrong
ATTORNEY

INVENTOR.
Thomas Andrews
by John J V Armstrong
ATTORNEY

Dec. 13, 1955  T. ANDREWS  2,726,939
PROCESS FOR EXTRACTING SOLIDS
Filed April 29, 1949  6 Sheets-Sheet 6

INVENTOR.
Thomas Andrews
by John J. V. Armstrong
ATTORNEY

United States Patent Office 2,726,939
Patented Dec. 13, 1955

2,726,939

PROCESS FOR EXTRACTING SOLIDS

Thomas Andrews, Driffield, England, assignor to Rose, Downs & Thompson Limited, Kingston-upon-Hull, England, a British company Application April 29, 1949, Serial No. 90,384

Claims priority, application Great Britain April 29, 1948

6 Claims. (Cl. 23—310)

This invention is concerned with an improved method for leaching a soluble portion from an insoluble portion of a material. Whilst the invention is of general application to all materials capable of being separated into soluble and insoluble fractions by solvent extraction, it is of particular application to the removal of oil from an oil containing seeds or nuts.

The method of continuous extraction of a material in order to leach out a soluble portion from an insoluble portion hitherto employed has involved the use of apparatus in which raw material has been fed countercurrent to an extraction solvent, the arrangement being such that the solvent percolates through one portion of the material and then passes by gravity to a succeeding portion of the material. It has been usual to provide a series of containers charged with material arranged on a vertically or horizontally disposed continuous belt conveyor, the solvent percolating through one charged container dripping by gravity into the next succeeding container or being removed to the succeeding container e. g. by pumps. Such an arrangement has the disadvantages that it is subject to gravitational influences, to the rate of percolation of the extraction solvent through each compartment, which must obviously vary according to the density of the packing of the material in each compartment and to the fact that the installation of apparatus necessary to support a vertically disposed continuous belt conveyor is a relatively costly item.

An object of the present invention is to provide an improved method for leaching a soluble portion from an insoluble portion of a material in which the aforesaid disadvantages are substantially obviated. A further object of the present invention is to provide a method for leaching a material in which an enhanced extraction is obtained. A further object of the present invention is to provide a method for leaching a material in which the time of extraction is wholly controlled by the operative.

According to the present invention a method of leaching a soluble portion from an insoluble portion of a material comprises dividing the material to be extracted into a plurality of separate and preferably substantially equal quantities, passing each quantity in sequence countercurrent to a leaching solvent and alternatively washing and draining each separate quantity, whilst maintaining each charge in an intimate and static or quiescent contact with the solvent for a predetermined period of time before the solvent and solubles dissolved therein are drained from the charge. The fresh raw material is first subjected to the solvent action of the leaching solvent containing a maximum proportion of solubles which proportion is diminished in succeeding washes until finally the practically spent material is washed by fresh solvent containing no extractives.

In one form of the invention the raw material to be extracted is subjected to the process of static or quiescent extraction by the leaching solvent whilst disposed in comparatively great depth.

The method includes the recirculation of leaching solvent, if desired, at any one or more particular points in the cycle whilst maintaining an overall flow of leaching solvent countercurrent to the flow of material to be extracted.

Apparatus for leaching a soluble portion from an insoluble portion of a material according to the present invention includes a plurality of compartments adapted to progress cyclically within a closed chamber which is provided with a supply hopper and reservoirs for clean and partially saturated solvent adapted to feed raw material and solvent respectively to each compartment in sequence countercurrent to each other, each of the said compartments having inlet and outlet valves for leaching solvent and an outlet valve for spent material, which valves are automatically actuated in timed relationship by means of a sequence cycle controller whereby solvent at varying stages of concentration is automatically drained from one compartment and fed into its neighbouring compartment in a direction countercurrent to the direction of progress of the raw material.

In one form of the invention a cylindrical drum of circular cross-section open at its upper end and divided into a plurality of radial compartments each of which compartments is provided with an inlet valve and outlet valve for the extraction solvent, and a separate outlet valve for spent raw material, is rotatably mounted within a sealed casing, having a supply hopper and solvent reservoir communicating therewith, together with a valve controlling the supply of raw material from the supply hopper to each compartment being actuated in timed relationship by means of a common sequence cycle controller.

According to a further feature of the present invention, apparatus for leaching a soluble portion from an insoluble portion of a material includes a plurality of open compartments adapted to be charged with raw material and to move cyclically step by step within a closed chamber countercurrent to the flow of a leaching solvent, each of said open compartments having a drainage valve for leaching solvent and means for effecting its inversion in order to discharge spent meal, delivery of raw material and leaching solvent to each open compartment and the subsequent withdrawal of the spent meal miscella from each compartment being effected in timed relationship with the step by step movement of the open compartments within the closed chamber by means of a common sequence cycle controller.

A plurality of open compartments may be arranged to progress cyclically within a closed tunnel, preferably of circular configuration, provided with a valve-controlled supply hopper for raw material and a number of spaced valve-controlled inlet pipes for the delivery of clean solvent or partially-saturated solvent (miscella) to each open compartment, each of the open compartments having an outlet valve for leaching solvent and tipping means associated therewith for inverting the compartment at a predetermined point in the cycle, movement of each open compartment within the closed tunnel and the actuation of the hopper valve, the inlet and outlet valves for leaching solvent and the tipping means for inverting any one compartment being automatically effected by means of a common sequence cycle controller.

A plurality of open compartments of part-circular cross-sectional elevation having each a perforate false bottom and an outlet valve for leaching solvent screened by said false bottom, may conveniently be suspended from a circular rack wheel adapted to move on rollers around a circular track at the top of a closed tunnel, the periodic movement of the rack wheel and suspended compartments within the tunnel being effected by one or more hydraulically-operated pistons engaging with the rack wheel periodically.

Tipping means for inverting a compartment may conveniently consist of a part-planetary flange surrounding the compartment and having cogs or teeth which engage with a segmental gear wheel mounted on the closed tunnel and which is actuated through an intermediate gear train by means of an hydraulically-operated piston.

The invention will now be more fully described by way of illustration, with reference to two specific embodiments, as shown in Figures 1–5 and 6–10, respectively.

Figure 2:
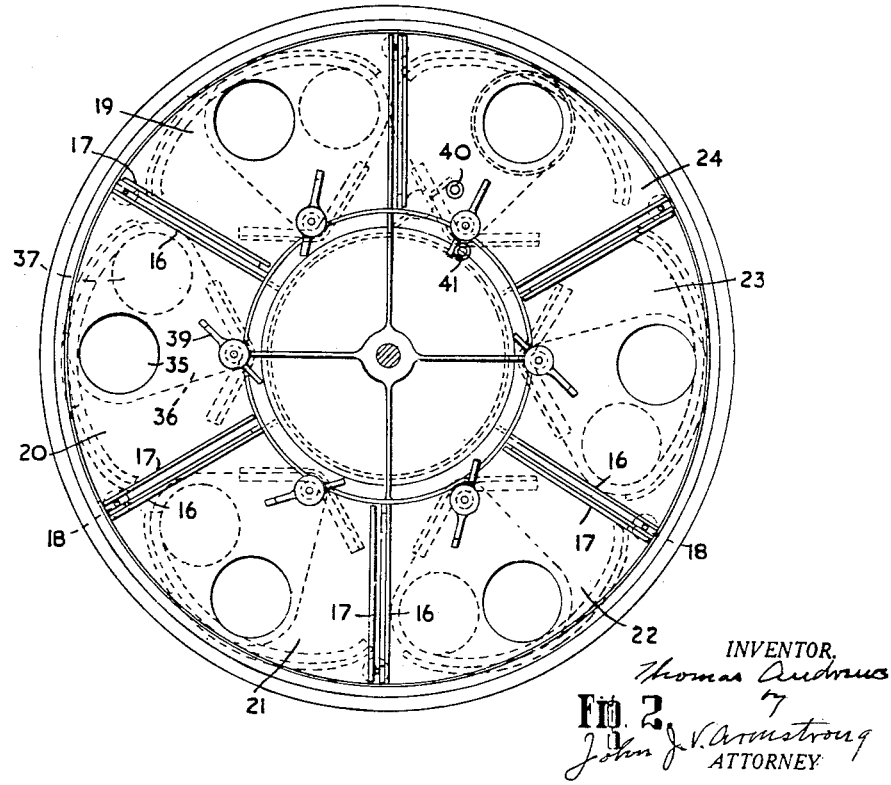
Figure 3:
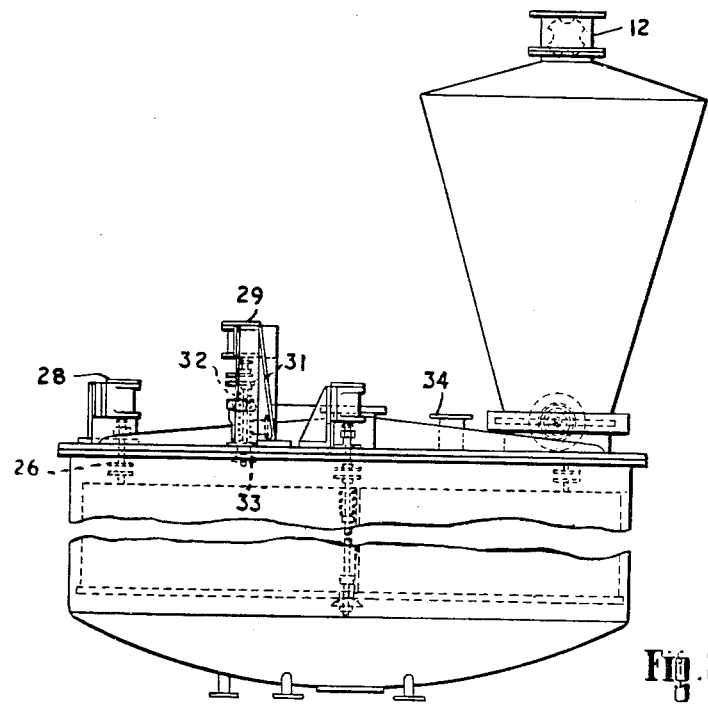
Figure 4:
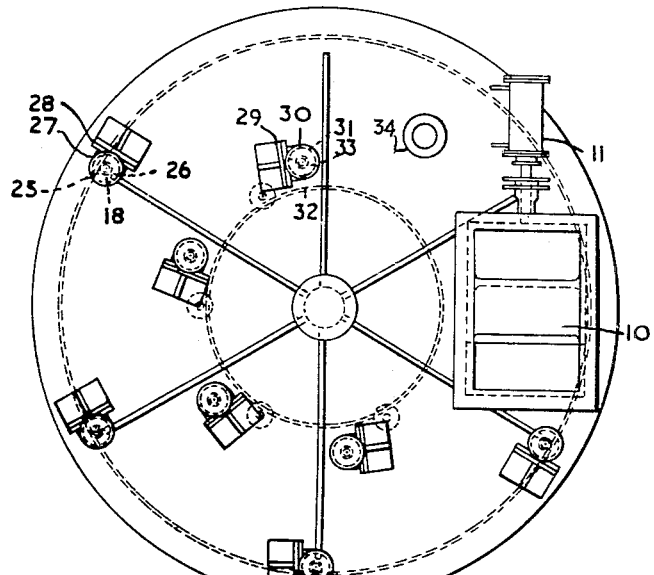
Figure 5:
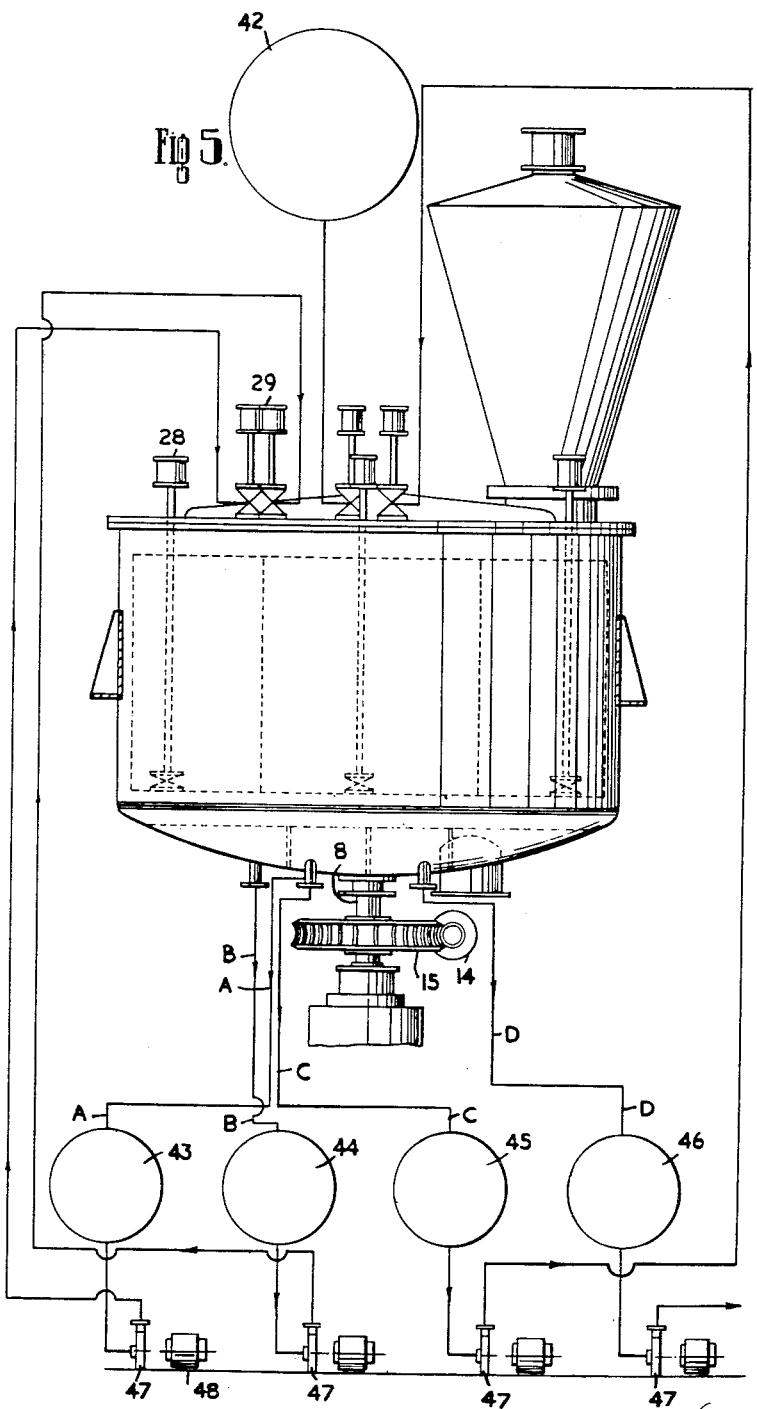

Considering, firstly, the embodiment shown in Figures 1–5:

Figure 1 represents a vertical sectional elevation;
Figure 2, a section on the line II—II of Figure 1;
Figure 3, a fragmentary elevation;
Figure 4 is a plan view corresponding to Figure 3, with the supply hopper removed;
Figure 5 is an elevation in combination with a flow sheet diagram.

The apparatus comprises a casing 1 of cylindrical elevation and circular cross-section having a curved base 2 and is sealed by a head plate 3. The base is divided by radial ribs 4 into six compartments of which four (disposed beneath the compartments 19—22 respectively) are provided each with an outlet 5. The base of the fifth compartment (disposed beneath compartment 23) is uninterrupted and the base of the sixth compartment (disposed beneath compartment 24) is connected to a discharge hopper 6. The base 2 is bored at its centre and bushed as at 7, to receive a rotatable shaft 8 as hereinafter described.

The head plate 3 of the casing is provided with a supply hopper 9 connecting with the interior of the casing through a slide valve 10 operated by a piston 11, the said hopper being itself sealed by a rotary valve 12. A chamber or drum 13 open at its upper end and mounted upon the shaft 8 driven by a motor 14 through worm gearing 15 is adapted to rotate within the casing 1. The said chamber 13 is divided into six radial compartments 19—24 corresponding to the compartments in the base 2 of the casing. Each of the radial dividing walls 16 is provided with a reticulate screen or strainer 17. Spring loaded outlet valves 18 communicating between the compartments 19—22 and corresponding compartments in the base of the casing are located between the solid divisional radial walls 16 and the said reticulate screens or strainers 17. Each valve 18 is operated through connecting rods 25 and plates 26 by movement of pistons 27 within assembly 28 mounted on the head plate 3. Separate inlet valve assemblies 29 comprising pistons 30, plates 31, connecting rods 32 and valves 33 mounted on the head plate communicate with each of the four compartments 19—22. An air release valve 34 is located in the head plate 3. Each of the six compartments 19—24 is provided with an orifice 35 in its base which orifice is open or shut according to the position of swing plate valves 36 having openings 37 which register with orifice 35 in the open position of the valve. The said swing plate valves are pivoted about vertical connecting rods 38 having cam surfaces 39 at their upper ends adapted to engage at one point in the cycle of revolution with stops 40, 41, dependent from the inner surface of the head plate 3. 42 is a supply reservoir for fresh solvent and tanks 43, 44, 45 and 46 are arranged in series with, respectively, compartments 19 and 20, 20 and 21, 21 and 22 and 22 to solvent recovery still and each separate circuit includes a pump 47 and motor 48.

In describing the manner in which the apparatus operates, it is pertinent to observe that the inlet and outlet valve assemblies for raw material and the inlet and outlet assemblies for solvent, whether fresh solvent or solvent containing a proportion of extracted material whereafter it is referred to as ¼, ½ or ¾ miscella according to its state of saturation, are each operated in a predetermined phase, both with respect to the rotating chamber and to each other, by means of one common sequence cycle controller.

The apparatus operates as follows: Raw material to be extracted is fed from hopper 9 through slide valve 10 into each of the six compartments 19—24 as each compartment passes beneath the said hopper in a clockwise direction. Fresh extracting solvent is delivered from tank 42 through valve assembly 29 into compartment 19. The solvent and nearly spent material, so termed because it has already been extracted in compartments 22, 21 and 20, respectively, are maintained in intimate and quiescent contact with one another for a predetermined length of time whereupon the outlet valve 18 is automatically opened by valve mechanism 28 and the solvent, now containing a proportion of solubles, and hereinafter referred to as ¼ miscella, drains away from the compartment 19 through the reticulate screen or strainer 17 into the compartment in the base of the casing registering therewith and hence into the tank 43 (see A Figure 5). It is pumped from this tank to the top of the adjacent compartment 20, i. e. in an anti-clockwise direction and is delivered to the said compartment through inlet assembly 29 when the latter is automatically opened in response to the sequence cycle controller. The ¼ miscella so supplied to compartment 20 remains in quiescent contact with the part-spent material contained therein for the predetermined period of time. The outlet valve 18 at the base of the compartment 20 is then opened and the extraction solvent, which has now extracted more soluble material and is now ½ miscella, passes through the reticulate screen 17 into the complementary compartment in the base of the casing and from there is fed into tank 44 (see B Figure 5). This ½ miscella is then pumped to the top of the next adjacent compartment in an anti-clockwise direction, i. e. 21 and is delivered into the compartment through valve assembly 29 at the appropriate moment. After a period of static contact with the once-extracted material therein, during which period the ½ miscella takes up still further solubles and becomes ¾ miscella, it is drained from the compartment through outlet valve 18, passes into tank 45 (see C Figure 5) and from there is pumped to the top of compartment 22. It will be appreciated that within 22, ¾ miscella is maintained in quiescent contact with fresh raw material. The ¾ miscella becomes saturated with solubles and the saturated solvent is then led away to tank 46 (see D Figure 5) and hence to a still for recovery of the solvent. Thus, the extraction solvent has flowed in an anti-clockwise direction and has changed from being fresh to being fully saturated during its passage through the four compartments 19—22.

As a variant within the above cyclic process, and if it is thought feasible to increase the leaching value of the solvent by recirculation through the same position of the meal, then this may be accomplished by causing the draining miscella to re-pass through the material from which it has just drained.

Consider, now, the raw material cycle. After delivery from the hopper 9 into compartment 23 it is subjected to its first extraction in the position of compartment 22. After undergoing extraction by ¾ miscella, it is extracted by ½ miscella in position 21, ¼ miscella in position 20, and finally, when it is already virtually spent material, by fresh solvent in position 19. The spent material then passes into the position of compartment 24, at which point cam 39 controlling the swing plate valve 36 at the bottom of the compartment engages with the stop 40. Owing to the dissimilar centres of rotation of compartment 24 and the cam 39, there comes a point at which cam 39 swings clear of stop 40 and the cam is so designed that the orifices 35 and 37 shall coincide at this moment. The spent material precipitates through the orifice 35 into the discharge hopper 6. On the completion of the stationary period and as the compartment 24 rotates into the position of compartment 23, the swing plate valve 36 is automatically closed by the other end of the cam 39 engaging with the second stop 41. Thus, an empty compartment is presented to the supply hopper 9 in the position 23 ready for recharging with fresh raw material.

Thus, the raw material cycle may be summarised as: Automatically filling a compartment in the position 23, washing the material with ¾ miscella in the position 22, washing the same material with ½ miscella in the position 21, washing the same material with ¼ miscella in the position 20, washing the same material with fresh solvent in the position 19 and finally dropping the spent material in the position 24.

The tanks 43, 44, 45 and 46, as also the solvent supply reservoir 42, may be heated or not to suit individual materials and solvents.

One particular application of the invention may be described with reference to the removal of an oil from an oil seed. Palm kernels, or other oil-bearing seeds and nuts, can be fed into the sealed casing 1 when suitably comminuted and hence passed through the various stages. In stage 1 the material will be fed into an empty compartment; e. g. 23 of the revolving drum. In stage 2, the material is washed with, say, trichlorethylene, or a petroleum fraction, containing oil extracted from material in preceding compartments. In stages 3 and 4, the material is extracted with solvents of less saturation until in stage 5 it is washed with fresh solvent admitted from reservoir 42. At no time need the comminuted seeds or meal be more than covered with the solvent and the resulting full miscella, i. e. the solvent drained from stage 2, has a very high oil content owing to the repeated use of the same quantity of solvent in each section. Moreover, recirculation of the solvent or miscella can be effected to enable enrichment of the solvent at any position.

In practice, it may be found convenient to install a spray in the casing 1 in order to reduce dust rising from material fed into the empty compartments.

Various detail modifications may be introduced without extending the scope of the present invention. The slide valve 10 and rotary valve 12 may be replaced by their mechanical equivalents. The reticulate screen 17 may equally well be disposed along the circumferential wall of each compartment and the position of the outlet valve 18 altered in conformity. Similarly, the outlet valve for spent material may embrace substantially the whole of the floor of the discharge compartment.

Figure 6:
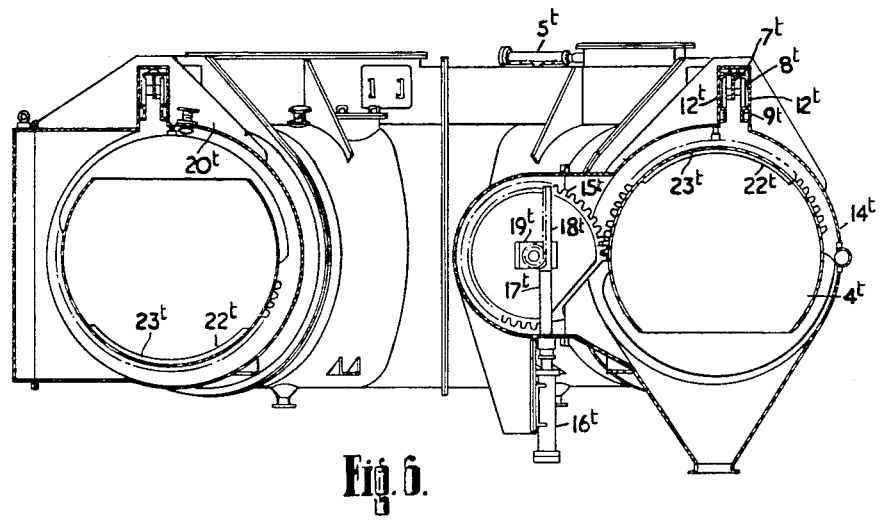

Considering, secondly, the embodiment shown in Figures 6–10:

Figure 6 is a sectional elevation showing the tipping mechanism and tunnel.

Figure 7:
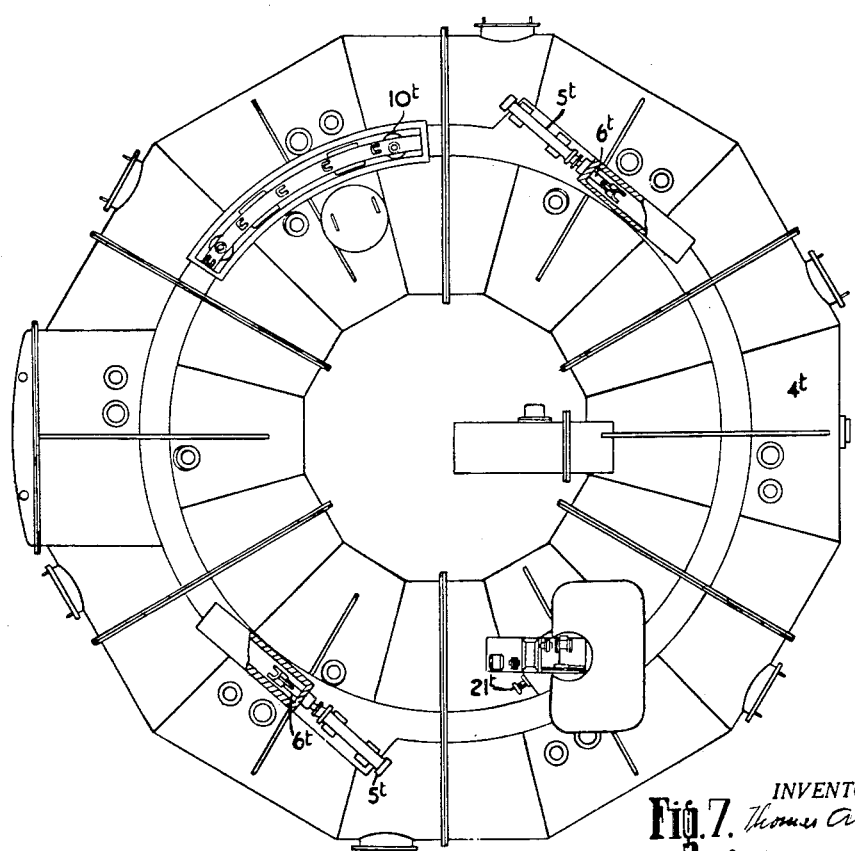
Figure 3:
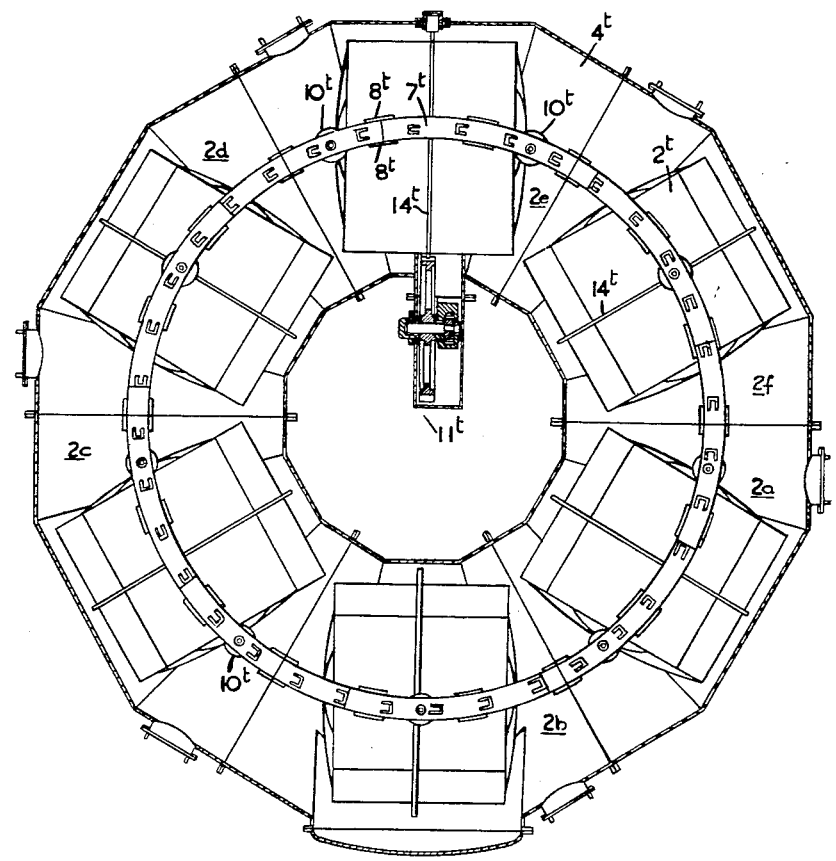
Figure 9:
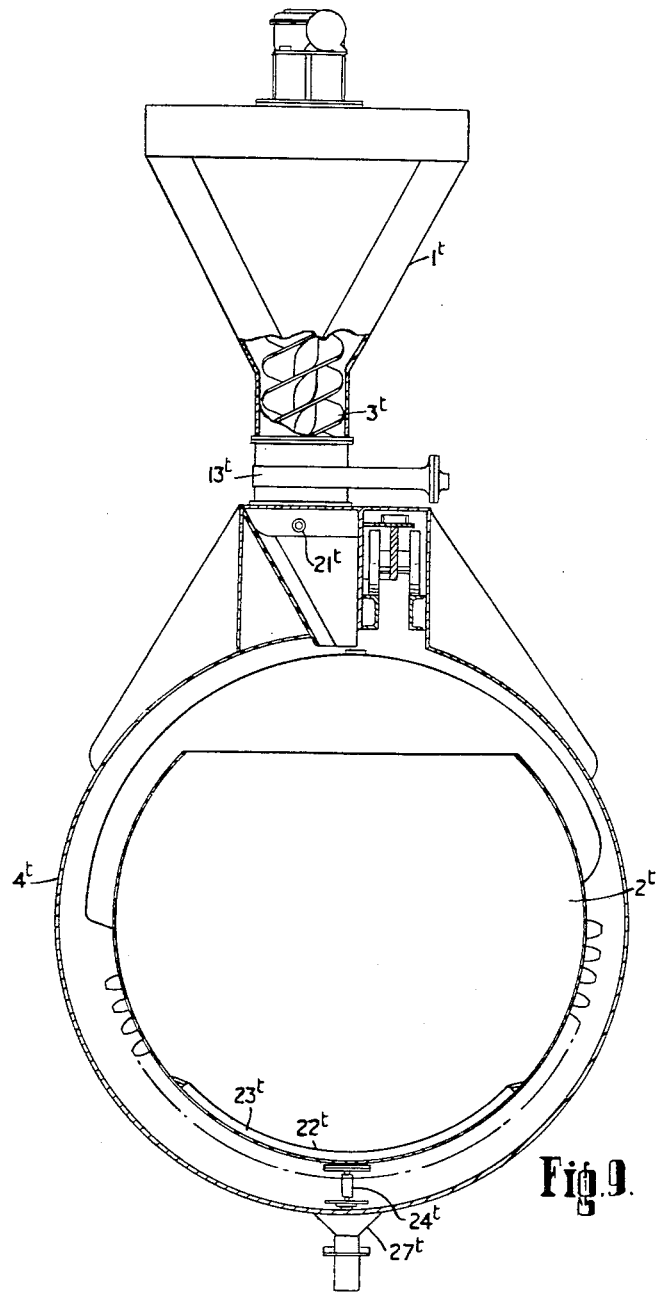
Figure 10:
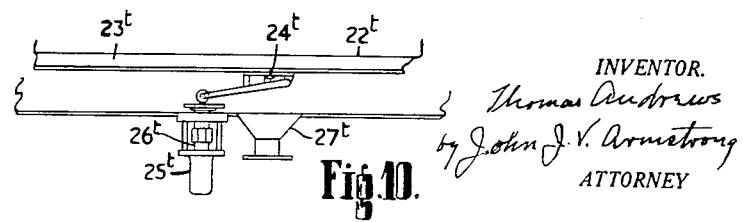

Figure 7 is a plan view of the tunnel broken away in parts to show the rack wheel and means for moving etc., Figure 8 is a sectional plan view showing the disposition of the open compartments, the rack wheel and the tipping mechanism, Figure 9 is a sectional elevation showing, inter alia, the raw material feed mechanism and the detailed construction of a compartment, and Figure 10 is a sectional elevation of the drainage valve assembly at the base of a compartment.

A supply hopper 1t, terminating in a feed screw 3t, communicates with one of six open compartments 2t disposed immediately beneath it through the intermediary of a slide valve 13t. The compartments 2t are suspended from a rack wheel 7t in the fixed relative positions 2f, 2a, 2b, 2c, 2d and 2e shown in Figure 8. The rack wheel 7t is adapted to rotate within the tunnel 4t upon rollers 8t travelling on a track 9t, movement of the rack wheel 7t being effected by means of hydraulically operated piston assemblies 5t having each a piston or ram 6t which engages with the rack wheel when extended. Rollers 10t spaced around the periphery of the rack wheel and contained within guide rails 12t maintain the rack wheel in a concentric position about the centre 11t. The hydraulically operated piston assemblies 5t are arranged such that the angular distance traversed by an open container under a number of predetermined impulses of a ram 6t is equivalent to 60° (i. e. 360° divided by the number of containers in the circular circuit).

Each compartment is surrounded by an interrupted planetary flange or toothed stay plate 14t protruding through the shell of the compartment 2t and which, in one position of the circuit, viz. the relative position 2e, meshes with a segmental gear wheel 15t having a further gear wheel 19t rigidly secured thereto, the latter gear wheel engaging with a rack 18t constituting an extension of a ram 17t forming part of an hydraulically operated piston assembly 16t. The arrangement of teeth on the segmental gear wheel 15t is such as to turn the compartment 2t through 180° when the rack 18t is fully extended.

Valve-controlled inlet pipes 20t for leaching solvent (whether clean or partially saturated, the so-called miscella), are arranged around the tunnel 4t directly above the relative positions 2a, 2b, 2c and 2d. A spray pipe 21t is disposed immediately above the compartment 2t through which miscella may be sprayed to wet the raw material during the active charging operation.

Each of the six compartments 2t are provided with perforated false bottoms 22t, beneath which an annular space 23t having a liquid drainage valve 24t communicates with a receiving well 27t when the valve 24t is opened in response to an impulse from a ram 26t forming part of the hydraulically operated piston assembly 25t.

The operation of the apparatus is as follows: Suitably prepared seed or other oily matter is delivered into the container 2t via the feed screw 3t and opens slide valve 13t, the speed and/or pitch and/or total number of revolutions of the feed screw 3t being adjusted to ensure that an appropriate charge of the prepared seed or oily matter is fed into the container 2t. The falling seed is sprayed with miscella derived from the extraction of material in the compartment occupying the relative position 2a, through 21t. At the end of the charging interval, as determined by the sequence cycle controller (not shown), the slide valve 13t is closed and under the influence of impacts from rams 5t acting on the rack wheel 7t, the compartment 2t moves in a clockwise direction into the relative position 2a. Whilst in this position, the valve-controlled inlet pipe 20t automatically delivers into the charged compartment miscella derived from the immediate adjacent extraction of material in the compartment occupying the relative position 2b. The solvent/miscella is allowed to rest in contact with the seed for a period of time determined by the sequence cycle controller at the end of which the valve 24t is automatically opened by an impulse received from the ram 26t, thus allowing the solvent to filter through the screen or false bottom 22t into the annular space 23t and hence to discharge into the receiving well 27t with which the discharge valve 24t is in vertical register. After a period of drainage as determined by the sequence cycle controller the valve 24t is shut and the compartment 2t is automatically moved into the relative position 2b, where a similar washing and drainage is effected. The same procedure obtains in relative positions 2c and 2d. In the position 2d, the now nearly-spent material is extracted with fresh leaching solvent introduced through the inlet pipe 20t. As the compartment moves into the relative position 2e, the toothed stay plate 14t meshes with the segmental gear wheel 15t and when, at a point determined by the sequence cycle controller, the ram 17t and extension rack 18t actuate the cog wheel 19t and hence the segmental gear wheel 15t, the compartment is inverted through 180° and its content of now exhausted meal are precipitated forth into a discharge hopper beneath. On the completion of the inversion and discharge, the sequence cycle controller causes the pressure of the fluid in the piston assembly 16t to be released whereupon the ram 17t descends and the compartment is brought back into its normal position ready for re-charging when it is moved into its original position.

This detailed description of the operation of the apparatus has been concerned primarily with the sequence of operations of the material undergoing extraction and it will be appreciated that as the compartment 2t passes in sequence through the relative positions 2a, 2b, 2c and 2d, the oil content of the material is progressively reduced until the exhausted or spent meal is discharged from the compartment in the relative position 2e. On the other hand, the leaching solvent flows countercurrent to the flow of raw material. Fresh leaching solvent is first introduced into the circuit above the relative position 2d and after effecting an initial extraction of material in a compartment in this relative position, flows of miscella of ever-increasing oil content through relative positions 2c, 2b and 2a. In this last position, the miscella already containing a high oil content meets with a charge of fresh raw material having a high oil content and after passage therethrough, the miscella has its maximum oil content and is then withdrawn for separation and recovery of the oil content and the solvent.

Whilst this particular embodiment of the invention has been described with reference to six compartments 2t, it will be appreciated that there is no limitation to the number which can be employed. The severity of the extraction desired is the governing factor.

I claim:

1. In a continuous system for the solvent extraction of oils or the like from solid particles, the steps comprising separately confining a succession of masses of solid oil-containing particles independently from one another, substantially simultaneously applying solvent to each mass, interrupting the application of solvent to each mass when said solvent reaches a predetermined level with respect to said mass, positively maintaining the solvent applied to each mass against drainage from said mass while the solvent is being applied to the mass and for a predetermined period of time after application of solvent to the mass has been interrupted, keeping the solvent and mass in still contact with each other during said predetermined period of time, then substantially simultaneously initiating solvent drainage from each mass and continuing said drainage until the solvent is drained from each mass, collecting the solvent drained from each mass, then moving each succeeding mass into the position previously occupied by its immediately preceding mass and repeating said solvent application, maintenance against drainage, and subsequent drainage, the solvent applied to the first mass of said succession of masses being fresh solvent and the solvent applied to each succeeding mass being solvent drained previously from a mass in a position immediately preceding said succeeding mass.

2. In a continuous system for the solvent extraction of oils or the like from solid particles, the steps comprising confining solid oil-containing particles in a series of separate movable compartments, applying solvent to all of said compartments, stopping the application of solvent when the particles in each compartment are covered by solvent, positively preventing drainage of solvent from each compartment while solvent is being applied to said compartment and for a predetermined period of time after application of solvent to said compartment is stopped, keeping the solvent and particles in still contact in each compartment during said predetermined period of time, initiating drainage of solvent from each compartment after the solvent and particles in each compartment have been in said still contact for said predetermined time, controlling said initiation of drainage by a control common to all compartments, continuing the drainage from each compartment until the solvent is drained from each compartment, moving each succeeding compartment into the position occupied by its immediately preceding compartment of said series of compartments, and repeating said solvent application, drainage prevention, and subsequent drainage, the solvent applied to the first compartment of said succession of compartments being fresh solvent and the solvent applied to each succeeding compartment being solvent drained previously from a compartment in a position immediately preceding said succeeding compartment.

3. In a continuous system for the solvent extraction of oils or the like from solid particles, the steps comprising confining oil-containing particles in a series of separate compartments movable in a substantially horizontal endless path of travel, each compartment containing substantially the same quantity of particles, moving said compartments along said path of travel, and, between each movement of a succeeding compartment to the position previously occupied by its immediately preceding compartment, applying solvent simultaneously to all of said compartments, stopping said solvent application when the particles in all compartments are covered by solvent, positively preventing drainage of solvent from each compartment while solvent is being applied to each compartment and for a predetermined period of time after said solvent application is stopped, keeping the solvent and particles in each compartment in still contact during said predetermined period of time, initiating drainage of solvent from each compartment after the solvent and particles in each compartment have been in said still contact for said predetermined time, controlling said initiation of drainage by a control common to all compartments, continuing the drainage from each compartment until the solvent is drained from each compartment, and collecting the solvent drained from each compartment and keeping it separate from the solvent drained from the other compartments, the solvent applied to the first compartment of the succession of compartments being fresh solvent and the solvent applied to each succeeding compartment being solvent drained previously from a compartment in a position immediately preceding said succeeding compartment.

4. In a continuous system for the solvent extraction of oils or the like from solid particles, the steps comprising confining oil-containing particles in a series of separate compartments movable in a substantially horizontal endless path of travel, each compartment containing substantially the same quantity of particles, moving said compartments intermittently, the extent of each intermittent movement being such that a succeeding compartment moves to the position formerly occupied by its immediately preceding compartment, and, between each intermittent movement and while said compartments are at rest, applying solvent simultaneously to all of said compartments, stopping said solvent application when the particles in all compartments are covered by solvent, positively preventing drainage of solvent from each compartment while solvent is being applied to each compartment and for a predetermined period of time after said solvent application is stopped, keeping the solvent and particles in each compartment in still contact during said predetermined period, initiating drainage of solvent from each compartment after the solvent and particles in each compartment have been in said still contact for said predetermined time, controlling said initiation of drainage by a control common to all compartments, continuing the drainage from each compartment until the solvent is drained from each compartment, and collecting the solvent drained from each compartment and keeping it separate from the solvent drained from the other compartments, the solvent applied to the first compartment of the succession of compartments being fresh solvent and the solvent applied to each succeeding compartment being solvent drained previously from a compartment in a position immediately preceding said succeeding compartment.

5. A method of leaching a soluble portion from an insoluble portion of a material comprising the steps of dividing the material to be extracted into a plurality of separate and independently supported quantities, moving each such quantity progressively along a predetermined path, applying to each such quantity of material a quantity of leaching solvent sufficient to effect total immersion of the quantity of material to be extracted, positively preventing drainage of leaching solvent from each such quantity of material while the leaching solvent is being applied to said quantity of material and after said quantity of material is totally immersed in said leaching solvent to provide a prolonged period of intimate and static contact between said quantity of material and said leaching solvent, thereafter draining the solvent from the material, and repeating the successive steps of applying leaching solvent, preventing drainage of the applied solvent, and thereafter draining the solvent from each quantity of material as it is moved progressively along a predetermined path, the last solvent applied to each such quantity of material being fresh solvent.

6. A method of leaching a soluble portion from an insoluble portion of a material comprising the steps of dividing the material to be extracted into a plurality of separate and independently supported quantities, moving each such quantity progressively along a predetermined path, applying to each such quantity of material a quantity of leaching solvent sufficient to effect total immersion of the quantity of material to be extracted, positively preventing drainage of leaching solvent applied to each such quantity of material while the leaching solvent is being applied to said quantity of material and after said quantity of material is totally immersed in said leaching solvent to provide a prolonged period of intimate and static contact between said quantity of material and said leaching solvent, thereafter draining the leaching solvent from said quantity of material, introducing the drained solvent successively into each successive separate and independently supported quantity, the solvent introduced into the first quantity of said succession of quantities being fresh solvent, and recirculating the solvent at any point in the cycle of operations to effect an enhanced localized extraction, the progressive movement of the separate and independently supported quantities of material and the successive washing and draining of each such quantity of material being automatically coordinated in a predetermined sequence.

References Cited in the file of this patent

UNITED STATES PATENTS

| Number | Name | Date |
|---|---|---|
| 97,059 | DeLime | Nov. 23, 1896 |
| 654,170 | Malard | July 24, 1900 |
| 813,078 | Bernhardt | Feb. 20, 1906 |
| 1,363,970 | Grondal | Dec. 28, 1920 |
| 1,411,154 | Bollmann | Mar. 28, 1922 |
| 1,453,749 | Christensen | May 1, 1923 |
| 2,127,360 | Helle et al. | Aug. 16, 1938 |
| 2,227,605 | Swallen et al. | Jan. 7, 1941 |
| 2,388,504 | Sturbelle | Nov. 6, 1945 |
| 2,510,221 | Harcourt | June 6, 1950 |